United States Patent

Menning

[15] 3,643,410
[45] Feb. 22, 1972

[54] RAKE AND TONGS COMBINATION

[72] Inventor: Walter A. Menning, 122 Harvard Street, Youngstown, Ohio 44512

[22] Filed: Dec. 17, 1970

[21] Appl. No.: 99,126

[52] U.S. Cl. ..........................................................56/400.12
[51] Int. Cl. ...............................................................A01d 7/10
[58] Field of Search ..................56/400.12, 400.05; 294/50.8

[56] References Cited

UNITED STATES PATENTS 1,588,927   6/1926   Willis....................................56/400.12
2,908,131   10/1959  Ross......................................56/400.12
3,350,866   11/1967  Spencer................................56/400.12

Primary Examiner—Antonio F. Guida
Attorney—Webster B. Harpman

[57] ABSTRACT

A lawn tool in the form of a pair of leaf rakes, the handles of which are crossed and pivoted to one another with one of them being offset to increase the area between the rake portions is disclosed which tool may be used as a grass or leaf rake and also as a grass or leaf pickup and carrying tongs by moving the rake portions relative to one another by their pivoted handles.

5 Claims, 3 Drawing Figures

PATENTED FEB 22 1972

3,643,410

INVENTOR.
WALTER A. MENNING
BY
W. B. Harpman
ATTORNEY

RAKE AND TONGS COMBINATION

BACKGROUND OF THE INVENTION

1. Field of the Invention:

This invention relates to lawn tools of the type used for raking grass and leaves and gathering the same as in removing them from a raked area.

2. Description of the Prior Art:

Prior structures of this type have been proposed which have utilized tools pivoted to one another so that they can be brought into tong like engagement by movement of the handles thereof. (see for example U.S. Pat. Nos. 715,090; 2,504,943 and 1,160,282).

This invention provides for offsetting one of the handles at the point of pivoting to the other and the resultant structure is able to handle a considerably larger accumulation of leaves or grass than the prior art devices.

SUMMARY OF THE INVENTION

A rake and tongs combination lawn tool comprising a pair of leaf rakes, one of which has its handle arranged with an elongated offset section are pivoted to one another in the area of the offset section and movable toward and away from one another in a tonglike action. When engaged against one another the tool is usable as a grass or leaf rake and when opened, by moving the rake portions away from one another, the structure is usable as a pickup and carrying tongs as for example with respect to grass or leaves to be removed from a given area.

DESCRIPTION OF THE PREFERRED EMBODIMENT

Figure 1:
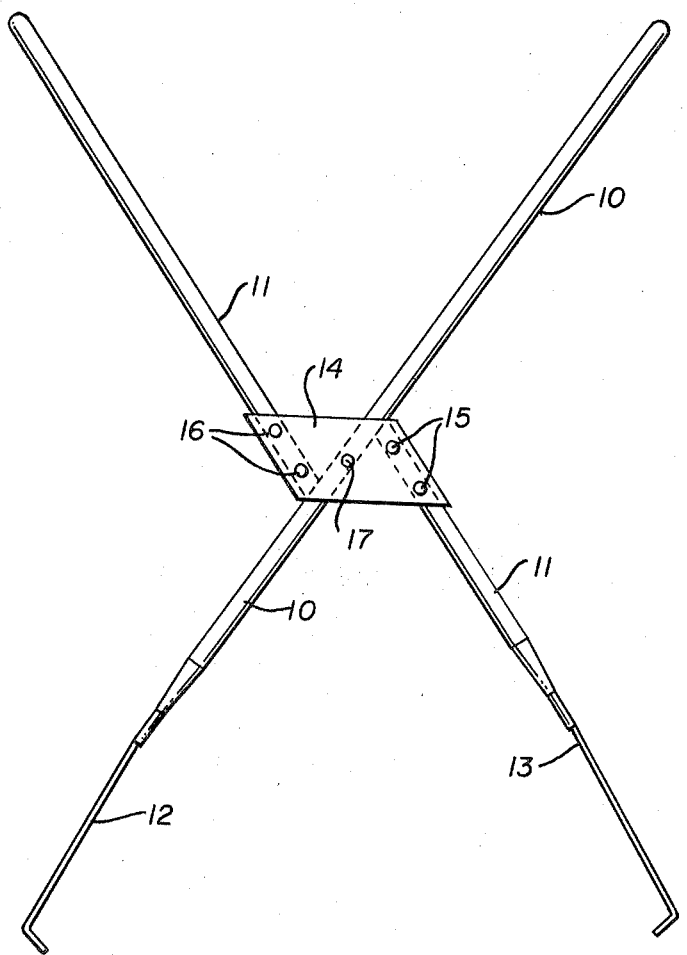
FIG. 1 is a side elevation of the rake and tongs combination lawn tool.

In its simplest form the rake and tongs combination lawn tool disclosed herein is comprised of a pair of grass or leaf rakes having handles 10 and 11 respectively and tine assemblies 12 and 13 respectively. The handle 11 of one of the grass or leaf rakes is cut substantially midway between its ends and joined in offset relation by a clamping plate 14. Fasteners 15 join the lower portion of the handle 11 to the clamping plate 14 and the fasteners 16 join the upper portion of the handle 11 to the opposite side of the clamping plate 14.

A pivot 17 extends through the clamping plate and the handle 10. It will be observed that the clamping plate 14 is of sufficient length so that the portions of the handle 10 immediately above and below the pivot 17 are free to move in an arcuate path of substantially 90° before contacting the ends of the handle 11 which are attached to the clamping plate 14 in spaced relation.

Figure 2:
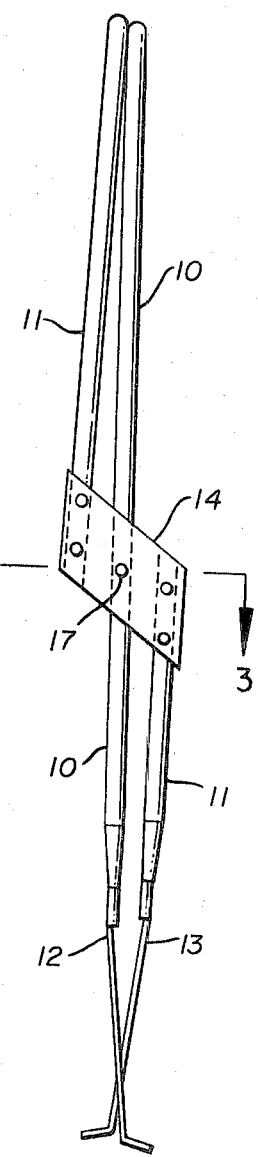
FIG. 2 is a side elevation of the lawn tools shown in FIG. 1 with the parts in a different position.

The arrangement is such that the tine assemblies 12 and 13 of the rakes are movable into a relatively widely spaced position as seen in FIG. 1 of the drawings and from that position into a closely spaced and engaging relation as seen in FIG. 2 of the drawings.

Figure 3:
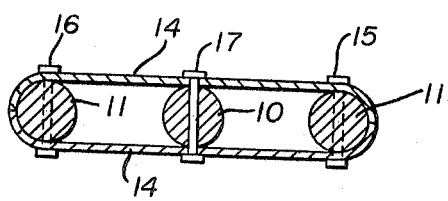
FIG. 3 is an enlarged cross section on line 3—3 of FIG. 2.

Those skilled in the art will observe that moving the handles 10 and 11 and specifically the upper portions thereof relative to one another will actuate the device. The clamping plate 14 may and preferably does comprise a pair of plates 14 as seen in FIG. 3 of the drawings which hold and guide the offset handle arrangement.

By referring now to FIG. 2 of the drawings it will be observed that when tine assemblies 12 and 13 of the rakes are placed in engaged relation, the tool may be used as a conventional leaf or grass rake as in gathering up grass or leaves on a lawn area and that when an accumulation of grass or leaves has resulted, the tool may be opened to the tonglike arrangement shown in FIG. 1 whereupon a rather large volume of grass or leaves may be picked up and clamped between the tine assemblies and moved to a point of disposal.

The above described structure provides relatively fast and easy operation of the rake and tongs combination lawn tool and provides a lightweight, inexpensive and efficient tool for the indicated purpose.

Although but one embodiment of the present invention has been illustrated and described it will be apparent to those skilled in the art that various changes and modifications may be made therein without departing from the spirit of the invention and having thus described my invention what I claim is:

1. A rake and tongs combination lawn tool comprising a pair of rakes having elongated tine assemblies secured to individual handles, the handle of one of said rakes being formed in two portions offset with respect to one another, a clamping plate attached to said portions of said rake handle and arranged to position said portions in spaced relation, the handle of the other of said rakes being pivoted to said clamping plate so that said tine assemblies may be moved toward and away from one another by manipulation of said handles.

2. The lawn tool of claim 1 wherein said tine assemblies are arranged for interengaging movement whereby one tine assembly will move partially through the other.

3. The lawn tool of claim 1 wherein the tine assembly on one of the rake assemblies is positioned relatively closer to said clamping plate than the other.

4. The lawn tool of claim 1 wherein the clamping plate extends across both sides of said handles.

5. The lawn tool of claim 1 wherein the upper end of the lower portion of the rake handle that is formed in two portions is positioned adjacent the upper edge of said clamping plate and the lower end of the upper portion of said two portions is positioned adjacent the lower edge of said clamping plate, and the pivot joining said clamping plate to said other handle is midway between the ends of said clamping plate.

* * * * *